(12) United States Patent
Ellanti et al.

(10) Patent No.: US 7,437,469 B2
(45) Date of Patent: Oct. 14, 2008

(54) VIRTUAL NETWORK ELEMENT FRAMEWORK AND OPERATING SYSTEM FOR MANAGING MULTI-SERVICE NETWORK EQUIPMENT

(75) Inventors: Manohar Naidu Ellanti, Fremont, CA (US); Harinder Singh, San Jose, CA (US); Steve Langlois, Santa Clara, CA (US); Ashok Ganesan, Santa Clara, CA (US)

(73) Assignee: Ciena Corporation, Linthicum, MD (US)

(*) Notice: Subject to any disclaimer, the term of this patent is extended or adjusted under 35 U.S.C. 154(b) by 660 days.

(21) Appl. No.: 10/853,166

(22) Filed: May 26, 2004

(65) Prior Publication Data

US 2006/0031312 A1    Feb. 9, 2006

(51) Int. Cl.
*G06F 15/16* (2006.01)

(52) U.S. Cl. .............. 709/229; 709/223; 709/242; 709/238; 709/206; 709/209

(58) Field of Classification Search ............ 709/238, 709/229, 223, 206, 209, 242
See application file for complete search history.

(56) References Cited

U.S. PATENT DOCUMENTS

| | | | | |
|---|---|---|---|---|
| 6,535,924 | B1* | 3/2003 | Kwok et al. | 709/242 |
| 7,099,947 | B1* | 8/2006 | Nadeau et al. | 709/229 |
| 2002/0174207 | A1* | 11/2002 | Battou | 709/223 |

* cited by examiner

*Primary Examiner*—Nathan J. Flynn
*Assistant Examiner*—Kyung H Shin
(74) *Attorney, Agent, or Firm*—Clements Bernard Miller; Christopher L. Bernard; Tyler S. Brown

(57) ABSTRACT

A managed network element is partitioned into one or more virtual network elements. The managed network element may be partitioned based on physical components or services provided by that network element. Each virtual network element is then provided a respective agent to monitor and manage its portion of the managed network element.

17 Claims, 10 Drawing Sheets

VIRTUAL NETWORK ELEMENT FRAMEWORK AND OPERATING SYSTEM FOR MANAGING MULTI-SERVICE NETWORK EQUIPMENT

FIELD OF THE INVENTION

This invention relates generally to networks and communications, and more specifically, to managing network equipment.

BACKGROUND OF THE INVENTION

Today, a telecommunications network can support multiple types of services, such as voice, data, and video, using optical network technology. A widely adopted optical network technology is Synchronous Optical Network/Synchronous Digital Hierarchy ("SONET/SDH") technology, which is based on standards defined by International and North American standards bodies.

SONET/SDH networks require a significant amount of effort for operations, administration, maintenance, and provisioning ("OAM&P") due to the complexity and amount of traffic that is carried by these networks. Typically, operators of SONET/SDH networks employ operations support systems ("OSS") that are based on one or more OAM&P protocols. Some common OAM&P protocols include the Telecommunications Management Network ("TMN") protocol, Transaction Language 1 ("TL1"), the Common Management Information Protocol ("CMIP"), and the Simple Network Management Protocol ("SNMP"). These protocols provide a variety of services including performance monitoring services, fault management services, and remote management services.

However, an OSS can be difficult to implement in a telecommunications network, especially a network that supports multiple services or uses multiple types of equipment. Typically, an OSS uses agents that monitor and manage each piece of equipment. The agents are generally software that is installed in the managed equipment. An agent monitors the equipment, receives network management messages, notifies the OSS of any faults, and configures the equipment in response to commands from the OSS. In order to perform these functions, an agent creates a set of managed objects within a management information base ("MIB") that model the resources and components of the managed equipment. Due to the wide variety of types of equipment and manufacturers, the software for agents of an OSS is difficult to write, certify, and maintain.

Accordingly, it would be desirable to provide an OSS or network management system that is easy to implement within a multi-service network. In addition, it would be desirable to provide an agent that is easy to implement in a wide variety of types of equipment.

SUMMARY

In accordance with this one feature of the invention, a physical network element is managed. The physical network element may comprise a plurality of virtual network elements (vNEs). Each vNE may operate independently and may have the properties of a physical or regular network element. According to some embodiments, a vNE may represent a logical partition of a physical network element. In addition, a vNE may represent one or more groupings of hardware/software resources that together implement a technology/service specific portion of a network element.

When a management message is received at the network element, at least one of the vNEs in the network element may be identified based on information in the message. The message is routed to the identified virtual network element. Information from a management information base that corresponds to the identified virtual network is then retrieved based on information in the message.

In accordance with another feature of the invention, a network element, comprises at least one communications interface, a first virtual network element, and at least one additional virtual network element. The communications interface is configured to connect to a network. The first virtual network element models a portion of the network element and the additional virtual network element models a separate portion of the network element.

In accordance with another feature of the invention, an optical network element comprises at least one interface that is configured to carry an optical signal, a splitter, an add/drop multiplexer, a first virtual network element, and a second virtual network element. The splitter is coupled to the at least one interface and is configured to copy the optical signal while continuing to pass the optical signal to at least one other network element. The add/drop multiplexer is coupled to the splitter and is configured to receive the copy of the optical signal. The add/drop multiplexer also selectively multiplexes another signal into the optical signal. The first virtual network element models the splitter based on objects stored in a first management information base. The second virtual network element models the add/drop multiplexer based on objects stored in a second management information base.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

The features of the present invention allow for the efficient management of multi-service networks. A managed network element is partitioned into one or more virtual network elements. The managed network element may be partitioned based on physical components, resources, or services provided by that network element. Each virtual network element is then provided a respective agent to monitor and manage its portion of the managed network element.

Reference will now be made in detail to the present embodiments of the invention, examples of which are illustrated in the accompanying drawings. Wherever possible, the same reference numbers will be used throughout the drawings to refer to the same or like parts.

Figure 1:
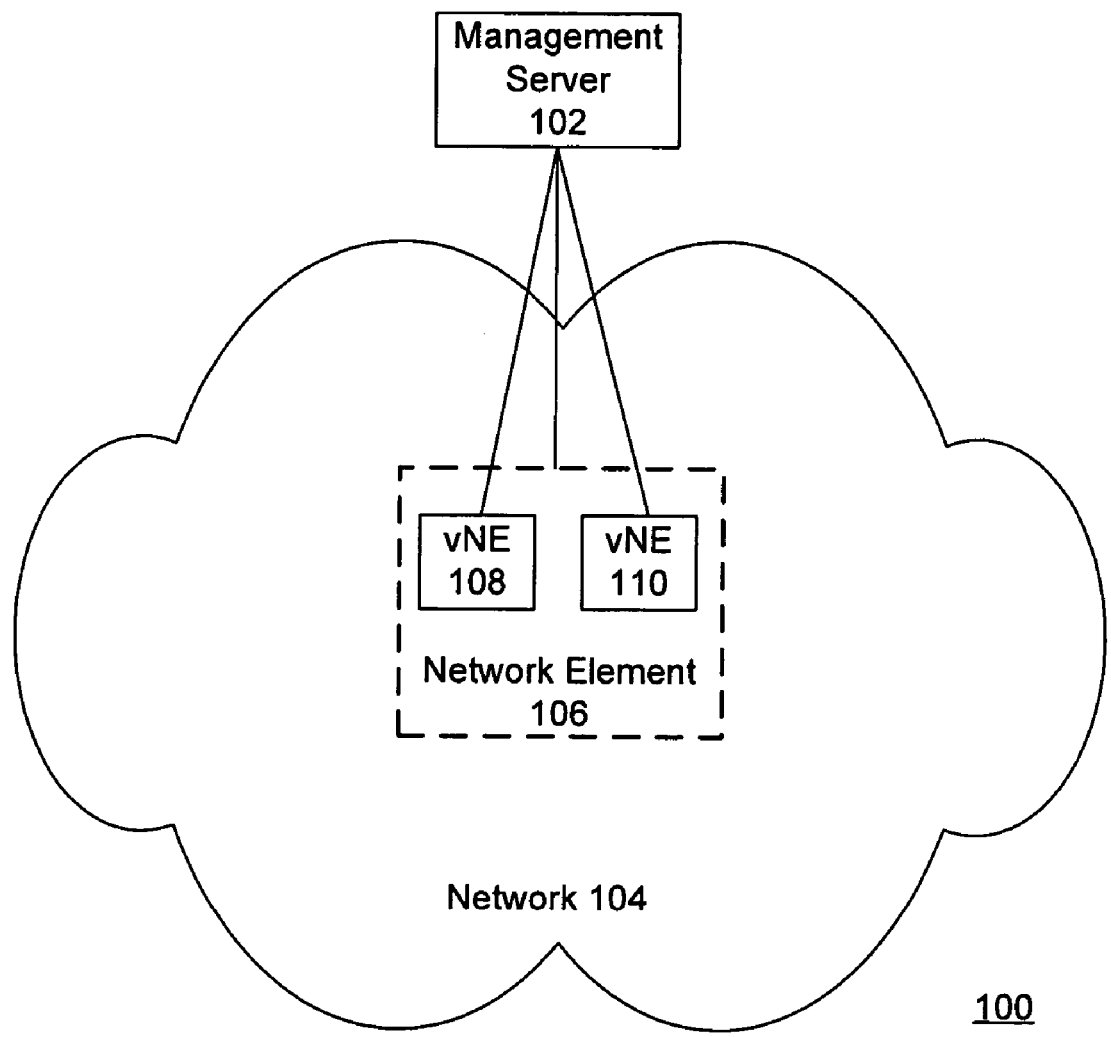
FIG. 1 shows a system that is consistent with the principles of the present invention.

FIG. 1 shows a system 100 that is consistent with the principles of the present invention. As shown, system 100 may comprise a management server 102, a network 104, and one or more network elements, such as network element 106. For purposes of illustration, network 104 is shown with a single network element, i.e., network element 106. However, network 104 may comprise any number of network elements or other networks. The interconnection of the components in system 100 will now be described.

Management server 102 provides a structure and platform for storing and managing the configuration of network 104 and system 100. Management server 102 receives information about the topology and configuration of each the network elements in network 104, such as network element 106. Management server 102 also provisions the network elements in network 104 and calculates paths in network 104. Other information that management server 102 may use for managing network 104 includes information regarding accounting of network resources, security, traffic measurements, and performance monitoring data. This network management information may be communicated within system 100 based on any known network management protocol, such as TMN, CMIP, or SNMP.

Management server 102 may be implemented using a variety of devices and software. For example, management server 102 may be a computer or processor that runs one or more application programs and stored procedures under an operating system, such as Linux, UNIX, or Windows. In addition, management server 102 may include a database management system, such as a relational database management system, to manage the information related to the configuration and provisioning of network 104. For example, paths configured in network 104 may be stored as a path object in this database. The specific data structure of a path object may be according to a variety of formats, which are known to those of ordinary skill in the art. Management server 102 is also described with reference to FIG. 2.

Management server 102 may be coupled to network 104 through a variety of links. For example, management server 102 may be coupled to one or more of network elements in network 104 via an Ethernet link, an IP link, or through a channel of a fiber optic link. In particular, management server 102 may be coupled to an Ethernet port of these network elements.

Alternatively, management server 102 may be coupled directly to one of the network elements of network 104, such as network element 106. Management server 102 may then be indirectly connected to the other network elements via channels in network 104, such as a SONET embedded operations channel or other in-band transport mechanisms available between the network elements.

Network 104 provides a communications infrastructure for passing information between devices, such as computers, servers, etc., that are connected to network 104. Network 104 may support multiple types of communications and multiple types of services, such as data, voice, and multimedia services. These communications and services may rely on a variety of known protocols and standards, such as the protocols and standards for SONET/SDH, ATM, IP, MPLS, etc.

As noted, network 104 may include any number of network elements, such as network element 106, or include one or more other networks which themselves comprise a plurality of network elements that are interconnected to each other. The network elements of network 104 may be connected together in a variety of topologies. For example, the network elements of network 104 may be connected together in a ring, mesh, or combination thereof. A network element may correspond to one or more physical devices. A network element, such as network element 106, can implement multiple SONET/SDH add/drop multiplexers, multiple dense wave division multiplexing optical add/drop multiplexers, multiple digital cross-connect systems, multiple data multiplexers, switches, or storage area networks. Each network element may also support multiple protocols or services, such as Ethernet, frame relay, asynchronous transfer mode, and Internet protocol.

The network elements of network 104 may be coupled together using a variety of types of links. For example, in some embodiments, the network elements of network 104 may be connected by one or more sets of optical links or "spans" to form an optical network. The optical fiber links used in network 104 may be either single-wavelength or multi-wavelength. Of course, network 104 may also support other types of links, such as SONET/SDH, IP, ATM, frame relay, Ethernet links, or any combination thereof.

In addition, as shown in FIG. 1, one or more of the network elements of network 104 may be partitioned into "virtual network elements" ("vNE"). A vNE may represent one or more groupings of hardware/software resources that together implement a technology or service of a network element, such as network element 106. For example, a physical network element can be modeled as the sum of its vNEs. Such a relationship may be expressed based one the following equation:

$$physicalNE = \sum_{1}^{n1} vNE_i(s1) + \sum_{1}^{n2} vNE_i(s2) + \ldots + \sum_{1}^{nn} vNE_i(sn)$$

$$\text{where } vNE_i = \sum_{1}^{i_m} s_i$$

corresponds to service instances of a vNE

As shown in the above equation, a physical network element may include 'n1' vNEs supporting service type 's1', 'n2' vNEs supporting service type 's2' and so on. Each vNE may support one or multiple instances of a service for which it exists.

For example, a network element may include 10 SONET/SDH vNEs, where SONET/SDH is a service type and each vNE is an instantiation of a SONET/SDH service. As another example, a network element may include 4 instances four separate SONET/SDH rings and each vNE represents one or more nodes that are a member of a ring.

A vNE may also correspond to various units of network operations. For example, a vNE may serve as a unit of OAM&P. That is, a vNE may be treated as a unit of provisioning, maintenance and operation, a unit of deployment, or as a unit that interacts with an operator, user, or operations support system "OSS."

For example, network element 106 may be partitioned into virtual network elements ("vNE") 108 and 110. VNEs 108 and 110 serve as representations of resources and components of network element 106. For example, vNEs 108 and 110 may represent different interfaces or ports installed on network element 106. As another example, vNEs 108 and 110 may represent a portion of a switch fabric (not shown) in network element 106. In order to represent these resources and components, VNEs 108 and 110 may be implemented as software programs written in a programming language, such as C, or C++.

VNEs 108 and 110 may operate independently and separately from each other. In other words, vNE 108 operate such that it does not effect the operation of vNE 110 and vice versa. For example, the software for vNEs 108 and 110 may execute using separate processing threads. In addition, vNEs 108 and 110 may use separately defined hierarchies to identify the objects that are managed under them and to keep their operations separate. Furthermore, vNEs 108 and 110 may be implemented to run different protocols or versions of software. For example, vNE 108 may be configured to run a TMN agent, while vNE 110 may be configured to run a SNMP agent.

This feature may provide several advantages. For example, software for either vNEs 108 or 110 may be separately released and managed. Accordingly, an upgrade to the software of vNE 108 may be separately certified and tested without impacting the operation of vNE 110. In addition, as new services, components, or resources are installed within network element 106, a new vNE may be created specifically to represent that new service, component, or resource, rather than modifying existing vNEs 108 and 110. These and other advantages may become apparent from practicing the present invention.

Figure 1A:
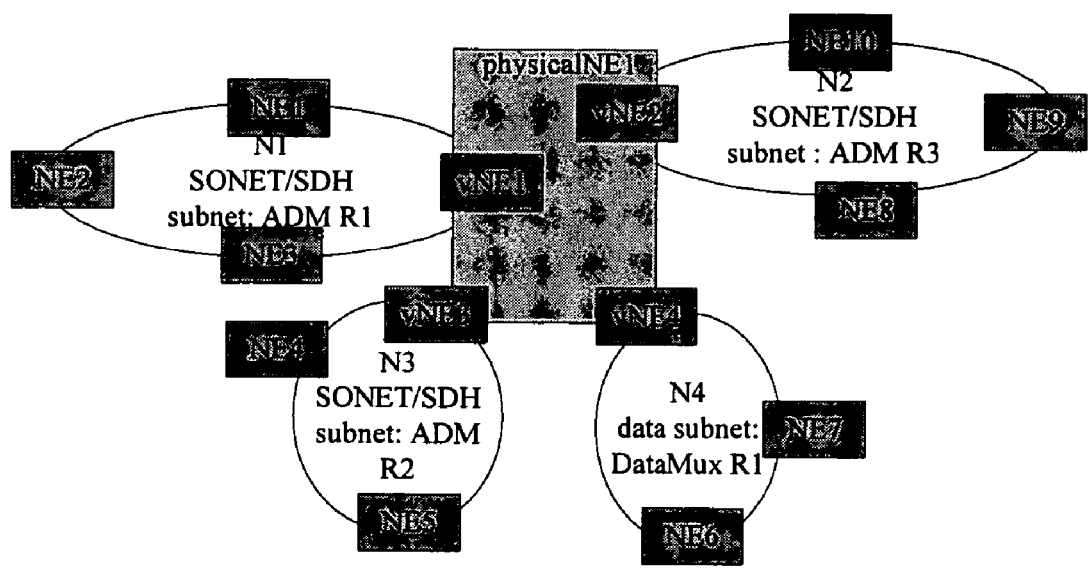
FIG. 1A shows one example of a physical network element housing multiple virtual network elements in accordance with the principles of the present invention.

FIG. 1A shows one example of a physical NE housing multiple vNEs and supporting multiple subnetworks in accordance with the principles of the present invention. As shown, a physical network element ("physicalNE1") may be connected to four networks, N1, N2, N3, and N4. Each of these networks may further comprise a set of network elements, NE1-NE10, respectively.

As shown, physicalNE1 may comprise a set of vNEs, such as vNE1, vNE2, vNE3, and vNE4. These vNEs may correspond to various components of physicalNE1, such as add/drop multiplexers. Given this, physicalNE1 may be deployed with a certain version of hardware and software in each of the vNEs-NE1.

For example, vNEs 1-4 may correspond to circuit packs of physicalNE1. Although vNEs 1-4 may be housed on the same physical device, they may also run different releases or versions of software and potentially different hardware as well. PhysicalNE1 may be configured to identify which hardware, software, routing table, data, resource etc. are the intended target of a vNEs 1-4.

Since a vNE is a unit of operation and interaction, access privileges for each vNE can be setup differently. Also, a vNE can provide operational isolation. That is, a user logged into vNE1 may be isolated from any operations of other vNEs, e.g., vNEs 2-4.

In addition, physicalNE1 may be used to pass information between one or more VPNs in a secure fashion. For example, if sub-networks N1 and N2 were part of the same VPN, then vNEs 1 and 2 may be configured to securely pass information between these sub-networks. However, vNEs 3 and 4 and sub-networks N3 and N4 may be segregated from this VPN.

In the event of an upgrade in hardware and software, physicalNE1 may be incrementally upgraded rather than upgraded across all of its subnetworks N1-N4. For example, vNE1 may be upgraded to correspond to an upgrade of network elements of NE1-3. The other networks N2-4 and network elements NE4-NE10 may be optionally upgraded at a later time. This feature may allow for economical upgrades and operations and as well as reducing the risk of introducing new software and hardware into existing networks. For example, an upgrade may have been limited to vNE1 and N1 in order to test the operational characteristics of new hardware or software. Other rationale may be known to those skilled in the art.

The vNE framework shown in FIG. 1A may also allow for multi-service convergence. For example, the Advanced TCA chassis standard allows different vendors to supply different components of a network element, such as physicalNE1. In some embodiments, a vNE may be provided or configured to correspond to such components.

Figure 1B:
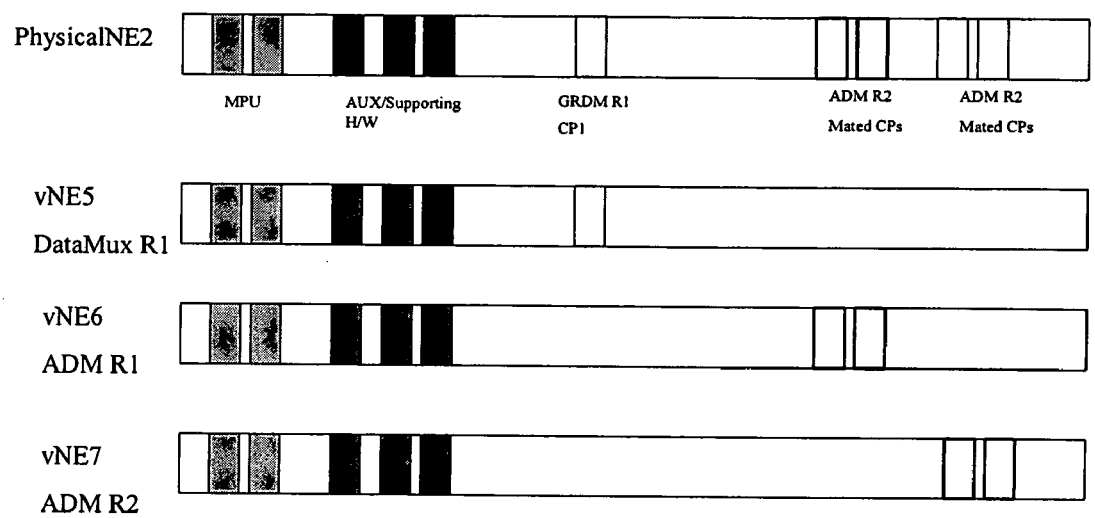
FIG. 1B conceptually illustrates how the operation of virtual network elements may be isolated from each other in accordance with the principles of the present invention.

FIG. 1B conceptually illustrates how the operation of virtual network elements may be isolated from each other in accordance with the principles of the present invention. As shown, a network element "physicalNE2" may comprise a set of vNEs, vNEs 5-7. VNEs 5-7 correspond to one or more circuit packs ("CPs") involved in supporting various services, such as GRDM and add/drop multiplexing services ("ADM"). For example, vNE5 may correspond to a data multiplexer "R1", while vNEs 6-7 may correspond to add/drop multiplexers "ADM R1" and "ADM R2," respectively.

When physicalNE2 is viewed, for example, by an OSS, the operations of vNEs 5-7 may be isolated from each other. For example, an OSS may be configured to see only hardware that is associated with vNE5 as well as some common equipment, such as a management processor ("MPU") or auxillary/supporting hardware ("AUX/Supporting H/W"). As shown, the processing work of associated with "GRDM R1 CP1" may be isolated to vNE5. Meanwhile, the processing work associated with ADM R1 and ADM R2 may be isolated to vNEs 6 and 7. One skilled in the art will also recognize other ways in which to isolate and view various portions of the operation in a network element.

Figure 2:
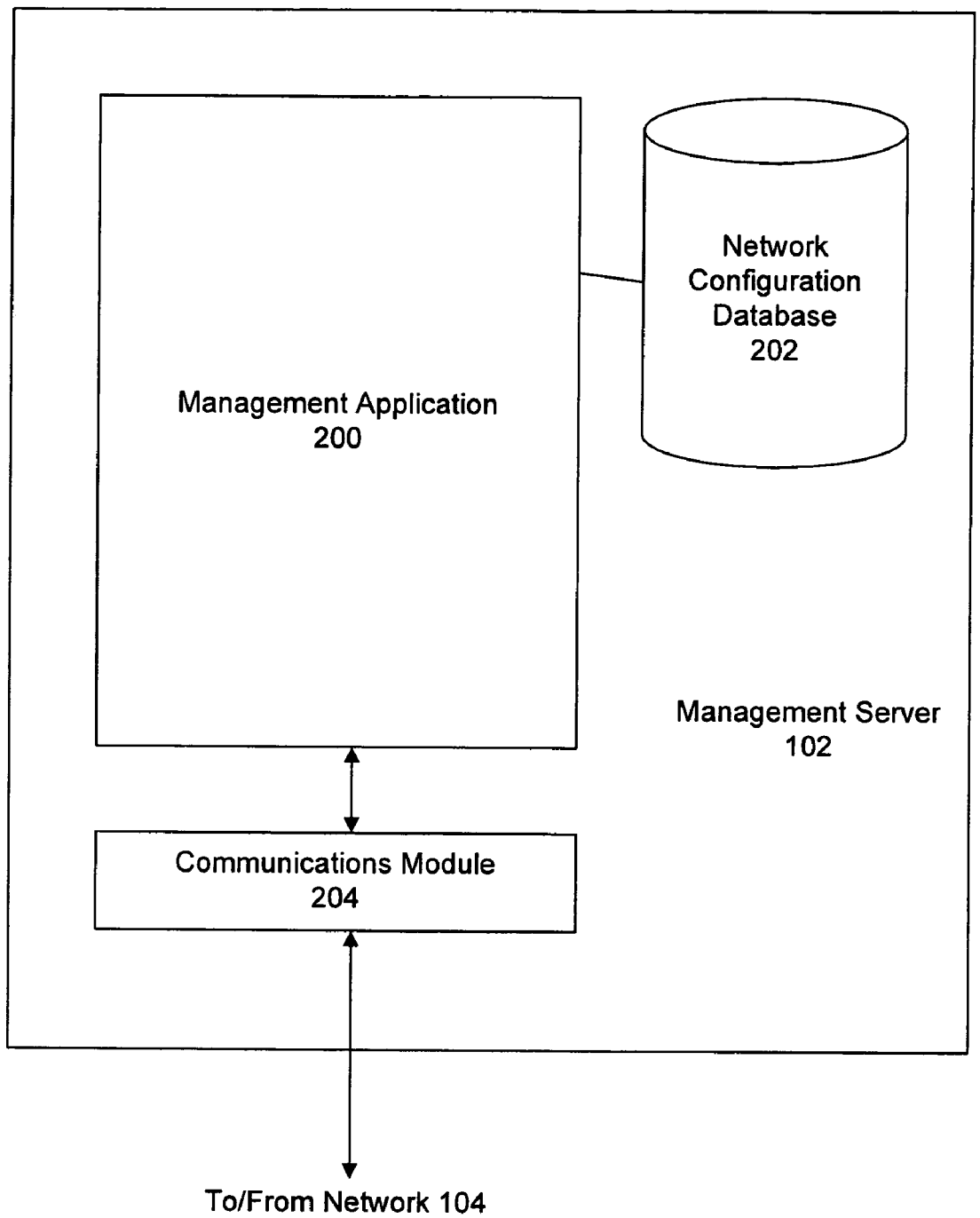
FIG. 2 illustrates a conceptual diagram of a management server in accordance with the principles of the present invention.

FIG. 2 illustrates a conceptual diagram of a management server in accordance with the principles of the present invention. Management servers are well known to those skilled in the art and may be implemented using any combination of hardware, firmware, and software. One conceptual example illustrated in FIG. 2 shows that management server 102 may comprise a network management application 200, a network configuration database 202, and a communications module 204.

Network management application 200 is program code that implements the functions and procedures of management server 102. Network management application 200 may be written in a variety of host programming languages, such as C, C++, Java, or COBOL.

Network configuration database 202 stores information that models the topology and provisioning of network 104. For example, paths configured in network 104 may be modeled by a path object, which indicates the network elements that are part of the path. In addition, a path object may include other information about a path, such as its bandwidth, protection scheme, and protection path in the event of a failure. Network configuration database 202 may also include objects that represent the resources, services, and components of network elements 110, 112, 114, and 116.

Network configuration database 202 may be implemented using a variety of devices and software. For example, network configuration database 202 may be implemented as a relational database or object-oriented database. In addition, network configuration database 202 may use a variety of types of storage, such as tape drive, optical storage units, or magnetic disk drive.

Communications module 204 serves as a communication interface for management server 102. For example, communications module 204 may communicate with network element 106 and other network elements of network 104 to collect information about the topology and provisioning of network 104. In some embodiments, these network elements pass TMN messages within the data communication channel ("DCC") portion of a SONET frame to communications module 204. Alternatively, communications module 204 communicates with network element 106 based on IP packets that are encapsulated within the user data portion of a SONET frame. Communications module 204 may communicate with any component of system 100 and use any communications protocol, such as CMIP, TL1, SNMP or others, resource reservation protocol ("RSVP"), Q.931/Q.2931, and optical signaling routing protocol ("OSRP").

Figure 3A:
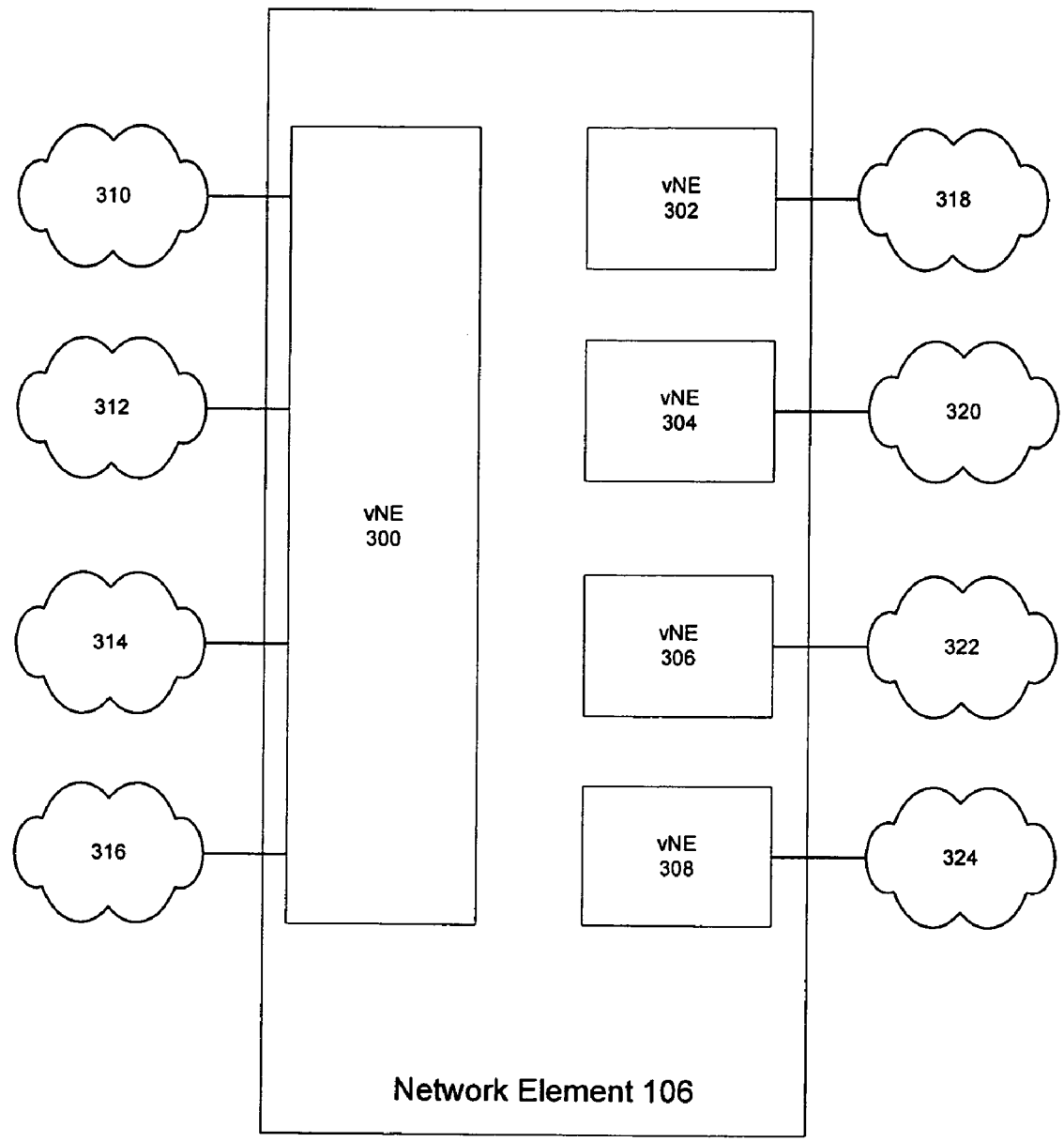
FIG. 3A illustrates a network element that is partitioned into virtual network elements in accordance with the principles of the present invention.

FIG. 3A illustrates one example of how network element 106 may be partitioned into virtual network elements in accordance with the principles of the present invention. In particular, network element 106 is partitioned into a plurality of vNEs in order to separate connections to different sub-networks of network 104. As shown, network element 106 is partitioned into vNEs 300, 302, 304, 306, and 308. VNE 300 represents the resources and components of network element 106 that are used to connect to sub-networks 310, 312, 314, and 316 of network 104. For example, vNE 300 may represent a SONET line card that includes multiple interfaces, such as OC-48 line side interfaces. Likewise, vNEs 302, 304, 306, and 308 may represent resources and components that connect to sub-networks 318, 320, 322, and 324 respectively. These sub-networks may support different service transport protocols, such as ATM, FR, Ethernet, IP, MPLS, etc., to different local area networks, different protocols, different locations, or multiple types of services, such as ATM, and IP. For example, sub-network 318 may be an Ethernet transport network, local area network, while sub-networks 320, 322, and 324 may be a SONET/SDH IP transport networks.

Figure 3B:
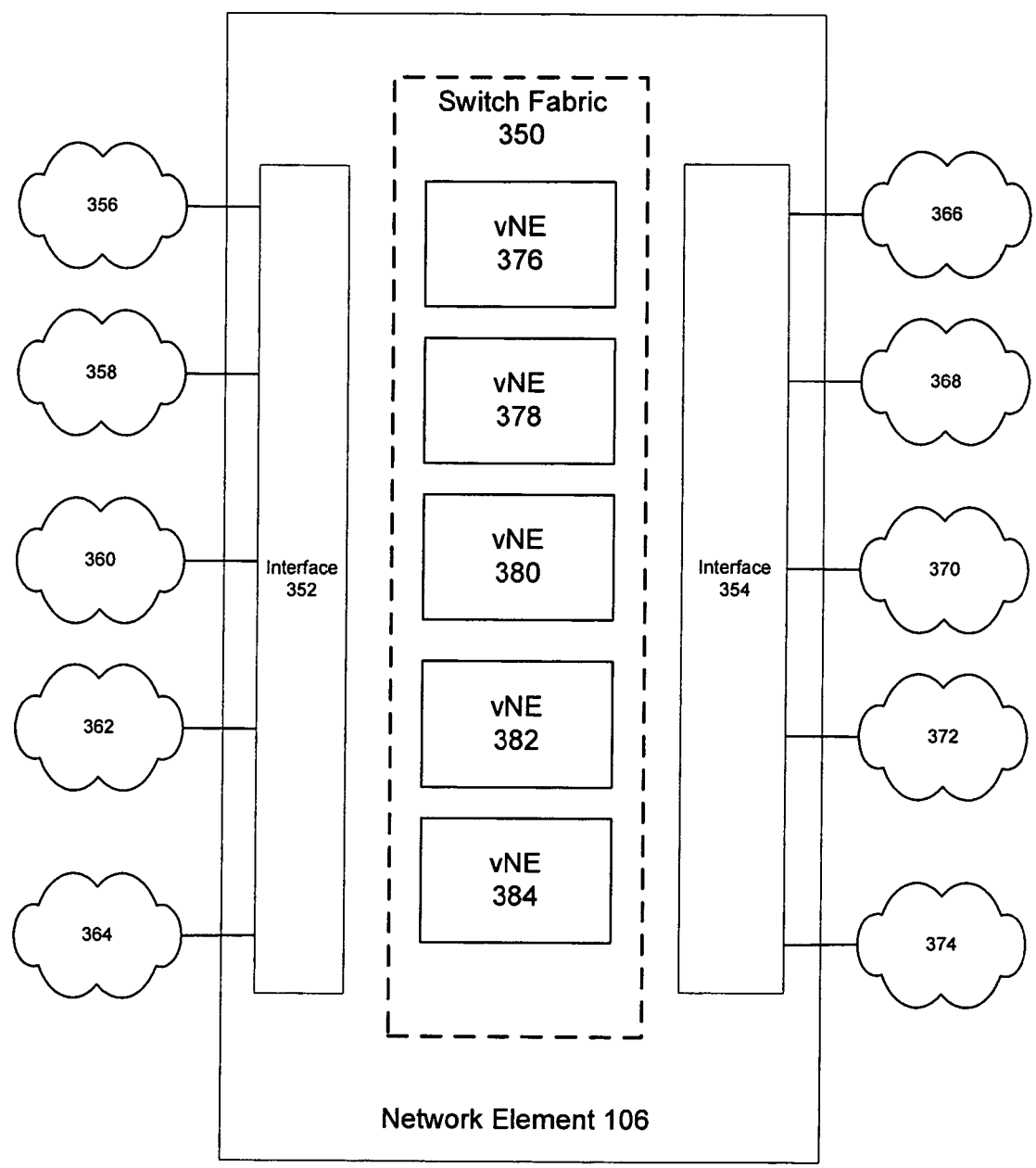
FIG. 3B illustrates another network element that is partitioned into virtual network elements in accordance with the principles of the present invention.

FIG. 3B illustrates another example of how network element 106 may be partitioned into virtual network elements in accordance with the principles of the present invention. As shown in this example, network element 106 may be a switch having a switch fabric 350 and any number of interfaces, such as interfaces 352 and 354. For example, network element 106 may be a SONET/SDH digital cross-connect wherein interfaces 352 and 354 are implemented as OC-n interfaces having multiple ports. As shown, interfaces 352 and 354 may be coupled to sub-networks 356, 358, 360, 362, 364, 366, 368, 370, 372, and 374 of network 104 respectively.

In addition, switch fabric 350 may be partitioned into vNEs 376, 378, 380, 380, 382, and 384. By partitioning switch fabric 350, a set of interfaces may be grouped as resources of switch fabric 350 and modeled as a virtual switch fabric into one vNE. For example, a 1024 port SONET/SDH OC-48 DCS may be partitioned into 8 smaller DCSs with each DCS housing 128 ports. Each of these smaller DCS may be managed using one vNE.

As another example, a DCS may be modeled with one or more vNEs as a set of ADMs. For instance, a 64 port DCS can be treated as a set of 6 ADMs (each one with 2 line ports and 8 drop ports). An ADM may be viewed as having an "East" interface, a "West" interface, and one or more drop side interfaces. Traffic can then be cross-connected across the DCS to either the East or West ports of a set of ADMs. In addition, one or two circuit packs of an ADM may be used as a backup. If any line card of an ADM fails, the shared backup card can be used instead. Each of these ADMs may be managed using vNEs. For example, a multi-port DCS may partitioned into vNEs that comprise 2 ports to represent the East and West interfaces and a set of ports representing drop ports. These vNEs may be internal to another vNE that represents the DCS as a whole. Hence, a device that comprises a switch fabric and interfaces/ports may also be broken into smaller virtual switches using multiple vNEs, and management server 102 (not shown in FIG. 3B) may then manage network element 106 as a set of "virtual" switches. This feature may be advantageous for several reasons, some of which are discussed below.

By partitioning network element 106 into separate vNEs (or virtual switches), network element 106 may be provisioned or upgraded as a set of multiple devices. Hence, upgrades for vNEs 376 and 378 may be implemented separately from vNEs 380, 382, and 384. This allows network element 106 to be upgraded or provisioned on a gradual basis and minimize the impact of any changes to only certain vNEs.

In addition, the partitioning of network element 106 may also allow for finer control of its resources and utilization. That is, network element 106 may support multiple types of networks that are overlaid onto sub-networks 356, 358, 360, 362, 364, 366, 368, 370, 372, and 374. For example, network element 106 may support an IP over time division multiplexed ("TDM") service, an ATM over TDM service, or TDM over WDM service. Accordingly, one or more of vNEs 376, 378, 380, 380, 382, and 384 may be assigned to these services, thus allowing, network element 106 to be managed and provisioned on a separate basis for each service. Use and operation of one vNE by may be configured such that technologies and details of other vNEs housed in the same physical NE may be independent of each other. For example, the IP over TDM service may be assigned a different vNE from the vNE assigned to the TDM over WDM service. Hence, the IP over TDM vNE can be managed by personnel skilled in IP while the other vNEs may be managed by personnel and OSS that specialize in other technologies. As a result, network element 106 may flexibly support different types of software and policies that are optimized for each of these services.

VNEs 376, 378, 380, 380, 382, and 384 may also be used to separate network 106 into multiple devices for supporting virtual private networks ("VPNs"). For example, protocols for VPNs, such as MPLS, BGP, OSPF, virtual routing etc., may be managed using a variety of vNE configurations. A physical router implementing multiple virtual routers can be managed using one or more vNEs. A vNE may be configured to provide a management view to just that part of the physical NE that is involved in supporting one particular VPN. Other vNEs may have access to routing tables and other data and resources of each virtual router as if the virtual router were a regular router.

Furthermore, the use of vNEs in network element 106 may assist in network restoration. For example, vNEs 380 and 382 may be configured to have its own peers with other vNEs on other network elements (not shown). In the event of a network casualty, the effects of the casualty may be isolated to only some of the vNEs rather than the entire network element. Also, each vNE of network element 106 may have its own restoration/signaling logic that are influenced by different policies, service priorities, etc. Therefore, vNEs 380 and 382 may recover from a network casualty differently than vNEs 376, 378, and 384.

Figure 4:
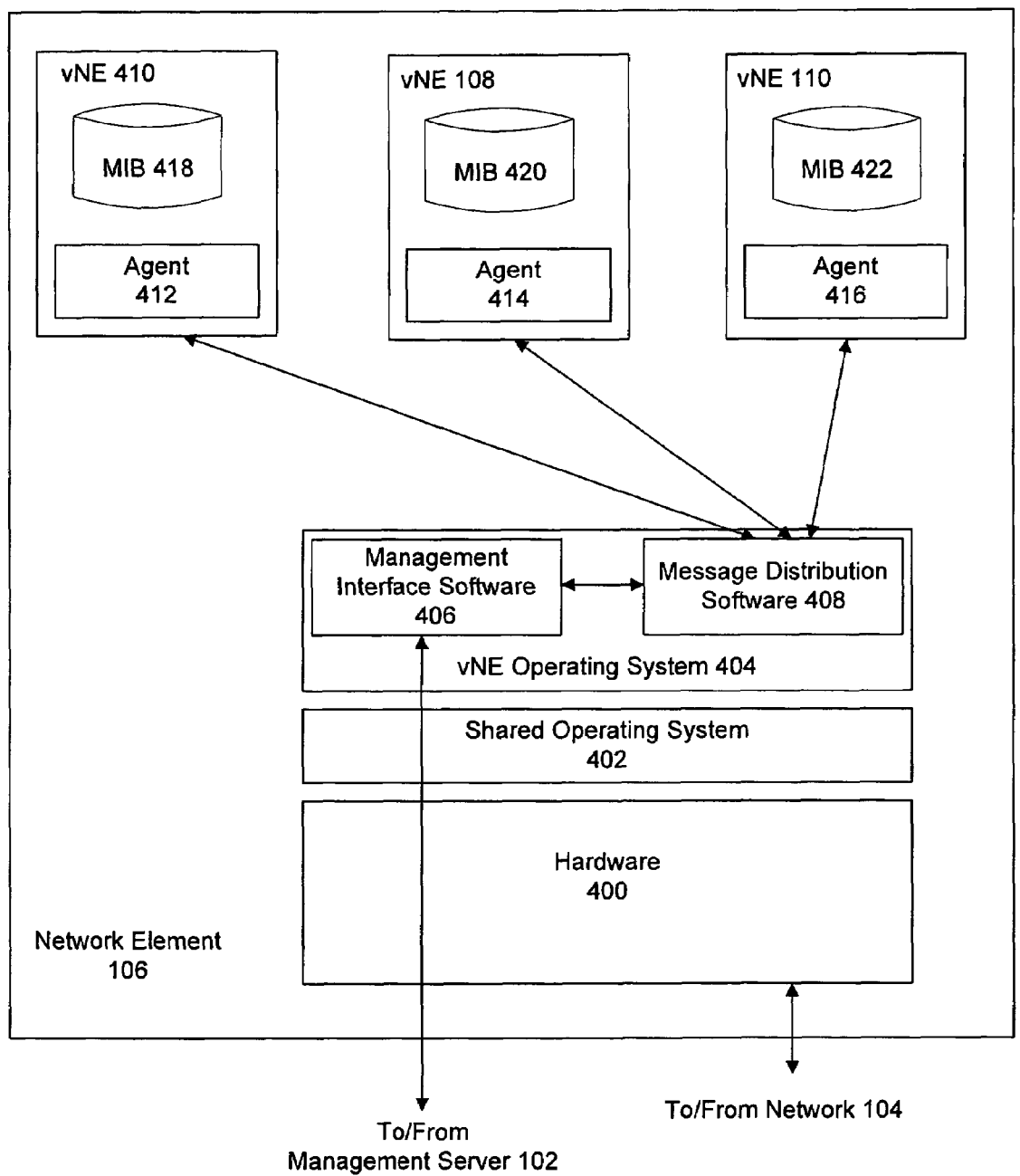
FIG. 4 illustrates a conceptual diagram of a network element that is partitioned into virtual network elements in accordance with the principles of the present invention.

FIG. 4 illustrates a conceptual diagram of network element 106 that is partitioned into virtual network elements in accordance with the principles of the present invention. As shown, network element 106 comprises hardware 400, a shared operating system 402, a vNE operating system 404, management interface software 406, message distribution software 108, a base vNE 410, and vNEs 108 and 110.

Hardware 400 represents the hardware components of network element 116, such as the processors, line cards, interface ports, circuit packs, switch fabric, etc. As noted, hardware 400 may be implemented as SONET/SDH equipment, SDH equipment, or SONET/SDH equipment. In addition, hardware 400 may also include one or more processors that are configured to execute software programs based on known operating systems, such as UNIX or LINUX.

Shared operating system 402 is the operating system that manages hardware 400. For example, shared operating system 402 may provide operating system level commands, device drivers, memory management routines, scheduler routines, and system calls for hardware 400.

VNE operating system 404 provides an operating environment for the virtual network elements. In particular, vNE operating system 404 distributes software and messages to base vNE 410 and vNEs 108 and 110. VNE operating system 404 may be implemented as a set of software modules having one executable instance, a set of software modules having multiple executable instances, or a set of loadable modules each having an executable instance. The instances running in vNE operating system 404 may map to a virtual network element directly, to a set of virtual network elements, or use some other technique. Alternatively, vNE operating system 404 may use dynamic link libraries to route software and messages to a particular vNE.

Management interface software 406 manages the communications between base vNE 410, vNEs 108 and 110, management server 102, and network 104. For example, management interface software 406 may include program code for sending/receiving TMN messages. In particular management interface software 404 may include a "Q3" interface for sending/receiving messages using. CMIP. In addition, management interface software 404 may include support for other management protocols, such as a "Q-adapter," to allow for communications based on other protocols, such as TL1, or SNMP. Alternatively, management interface software 404 may include program code for sending/receiving SNMP messages over an IP protocol, such as user datagram protocol ("UDP") or transport control protocol ("TCP").

Message distribution software 406 assists vNE operating system 404 in routing software and messages between management interface software 406 and base vNE 410, and vNEs 108 and 110. In particular, message distribution software 406 may route messages based on one or more identifiers or names that uniquely identify base vNE 410, vNEs 108 and 110, or some other object in system 100. For example, message distribution software 406 may include program code that understands identifiers formatted according to Abstract Syntax Notation 1 ("ASN.1"). As known by those skilled in the art, ASN.1 is a standardized syntax for identifying data and objects. Another way to distinguish messages is to use TL1's Target Identifier (TID).

Base vNE 410 serves as a representation of the common resources and components of network element 106. For example, base vNE 410 may represent components and resources, such as a central switch fabric, a power supply, a master processing unit, or a shared operating system. Base vNE 410 may be implemented as one or more software programs written in a known language, such as C, or C++.

VNEs 108 and 110 serve as representations of resources and components of a network element that may be partitioned from each other. As explained previously, vNEs 108 and 110 may, for example, represent different interfaces or ports installed on network element 106. As another example, vNEs 108 and 110 may represent one or more portions of a switch fabric (not shown in FIG. 4) in network element 106. In order to represent these resources and components, VNEs 108 and 110 may be implemented as one or more software programs written in a programming language, such as C, or C++.

As depicted in FIG. 3B, base vNE 410 and vNEs 108 and 110 may further comprise agents 412, 414, and 416 and management information bases (MIBs) 418, 420, and 422 respectively. Agents 412, 414, and 416 operate in conjunction with management application 200 running at management server 102. Agents 412, 414, and 416 may be implemented as one or more software programs that are responsible for processing network management messages from management application 200 and for configuring the respective resources assigned to them. Agents 412, 414, and 416 may be written in a known language, such as C, or C++.

Agents 412, 414, and 416 may monitor their respective vNEs based on reading the data in MIBs 418, 420, and 422 and may control the configuration of their vNE based on modifying the respective data in MIBs 418, 420, and 422. For example, vNE 108 may monitor and control its respective resources and components through agent 412 and MIB 416. Independently and separately, vNE 110 may monitor and control OADM 602 using agent 414 and MIB 418. Although FIG. 3B depicts three vNEs, any number of vNEs may be implemented within a network element.

MIBs 418, 420, and 422 are databases that store management information for their respective vNE. In particular, MIBs 418, 420, and 422 may include information and data relating to the provisioning of network element 106, events that occur during the operation of network element 106, alarms that have been triggered, and logs.

MIBs 418, 420, and 422 may be structured according to a variety of schemes. For example, MIBs 418, 420, and 422 may be stored on a single data storage device, or memory but implemented as separate sets of index records to a common or shared database instance. The data storage device may be a device, such as a tape drive, an optical storage unit, or magnetic disk drive. In this scheme, MIB 418 may serve as the master database of records since it corresponds to base vNE 410 and the common resources and components of network element 106. MIBs 420 and 422, on the other hand, may include pointers to records in MIB 418. Accordingly, vNE operating system 404 and message distribution software 408 may essentially manage MIBs 418, 420, and 422 in an integrated fashion as one database instance.

In other scheme, MIBs 418, 420, and 422 may be configured and stored as separate database instances on one or more data storage devices. The data storage device may be devices, such as tape drives, an optical storage units, or magnetic disk drives, or memory. In this scheme, MIB 418 may have pointers to MIBs 420 and 422 to identify which resources and components of network element 106 have been assigned to either vNEs 108 and 110. Accordingly, vNE operating system 404 and message distribution software 408 may then reference MIB 418 in order to determine where to route various messages and commands, for example, from management server 102.

In yet another scheme, MIBs 418, 420, and 422 are configured and stored as separate database instances on one or more data storage devices. In this scheme, each of MIBs 418, 420, and 422 are separately managed and organized. Therefore, vNE operating system 404 and message distribution software 408 may use this scheme to interact directly with each MIB on a separate and independent basis. Of course, other schemes for configuring MIBs 418, 420, and 422 may be used in accordance with the principles of the present invention.

Figure 5:
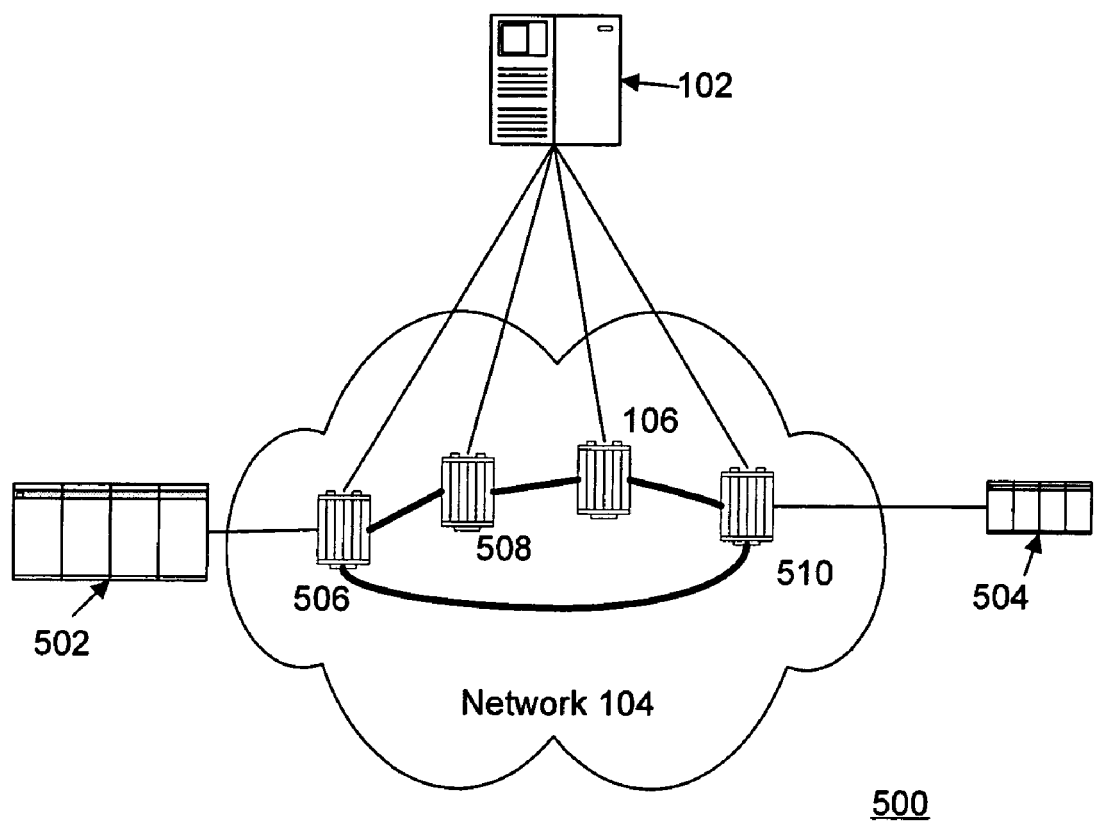
FIG. 5 shows an exemplary system that is managed in accordance with the principles of the present invention.

FIG. 5 shows an exemplary system that is managed in accordance with the principles of the present invention. As shown, system 500 may comprise one or more terminal devices 502 and 504, a management server 102, and a network 104. Network 104 may further comprise a set of network elements, such as network elements 106, 506, 508, and 510. The interconnection of these components will now be discussed.

Terminal devices 502 and 504 may be coupled to network 104 using known types of links. For example, terminal devices 502 and 504 may be coupled to network 104 using a fiber optic link, wireline link, or wireless link. In addition, terminal devices 502 and 504 may communicate with network 104 and each other using a variety of protocols, such as SONET, Ethernet, Frame Relay, Asynchronous Transfer Mode ("ATM"), or Internet Protocol ("IP"). Furthermore, terminal devices 502 and 504 may be coupled to one or more other networks (not shown).

As explained above with reference to FIG. 1, management server 102 may be coupled to network 104 using known types of links. For example, management server 102 may be coupled to network 104 through an Ethernet link, an IP link, or through a channel of a fiber optic link. Alternatively, management server 102 may be coupled directly to one of the network elements in network 104, such as network element 106. Management server 102 may then be indirectly connected to the other network elements, such as network elements 506, 508, and 510, via communication channels in network 104.

Network 104 may include one or more networks in which a plurality of network elements is interconnected to each other. For example, as shown in FIG. 5, network elements 106, 506, 508, and 510 may be connected together in a ring. For ease of discussion, from the point of view of the ring overall, information may travel between network elements 106, 506, 508, and 510 in either clockwise or counterclockwise directions, In addition, from a network element's point of view, the two directions may be arbitrarily designated east and west, or upstream and downstream. Although FIG. 1 shows a ring network, network 104 may include other types of configurations, such as network elements connected together in a linear fashion or in a mesh, wherein a plurality of network elements are directly connected to other network elements.

In the embodiment shown in FIG. 5, network elements 106, 506, 508, and 510 may be coupled together using one or more sets of optical links or "spans" to form an optical network. The optical fiber links used in network 104 may be either single-wavelength or multi-wavelength. Network elements 106, 506, 508, and 510 may transmit many signals on the optical fiber at the same time using known techniques, such as wavelength division multiplexing ("WDM") or dense wavelength division multiplexing ("DWDM"). Common wavelengths for use in fiber-optic transmission include wavelengths in the neighborhoods of 1310 nm and 1550 nm. The optical fiber used to connect network elements 106, 506, 508, and 510 may be single-mode or multi-mode.

In the discussion that follows, network elements 106, 506, 508, and 510 of network 104 are connected together to form a SONET-type network. That is, network elements 106, 506, 508, and 510 communicate with each other based on a SONET frame. The SONET frame uses time division multiplexing (TDM) carry multiple channels of information. In particular, each channel of information is given one or more timeslots within the frame. However, network elements 106, 506, 508, and 510 and network 104 may carry data in other forms, such as ATM cells, IP packets, or other types of packet data and synchronous data. Some of the components of system 500, i.e., terminal devices 502 and 504, and network elements 106, 506, 508, and 510, will now be further described.

In the embodiment shown in FIG. 5, system 500 may be used as part of a distribution network for delivering television services. Accordingly, terminal device 502 may serve as a head end facility for video signals that are carried by system 500. In particular, terminal device 502 may receive video feeds from a variety of sources, such as a TV broadcast service or satellite network. The video feeds may be transmitted using known analog signal formats or digital signal formats, such as the Digital Video Broadcasting Group ("DVB") format. As a head end facility, terminal device 502 may then encode the video feeds into a format that is carried by network 104. For example, terminal device 502 may encode the video feeds into MPEG streams that are carried within IP packets over SONET frames using, for example, Packet Over SONET (POS) or IP over Ethernet over SONET (EOS). MPEG is a known standard that is maintained by the Motion Pictures Expert Group. One skilled in the art will also recognize that system 500 may also include any number head end facilities.

Terminal device 502 may be implemented using known types of equipment, such as a computer, router, or switch. In addition, as noted above, terminal device 502 may be connected to another network (not shown).

Terminal device 504 may serve as a distribution point for routing the television signals from terminal device 502, i.e., the head end facility to remote end facilities, such as a subscriber's residence. In particular, when serving as a distribution point, terminal device 504 receives data from terminal device 502, parses individual programs or channels from the data, and routes and programs or channels to the remote end facilities. Terminal device 504 may further include one or more other devices for distributing and routing the television signals.

Terminal device 504 may be coupled to network 104 using various types of links. These links may be a gigabit Ethernet link, an OC fiber link, a digital subscriber line ("DSL"), coaxial cable, a wireless link, or fiber to the home ("FTTH") link.

As explained above with reference to FIG. 1, management server 102 provides a structure and platform for storing and managing the configuration of network 104. Other information that management server 102 may use for managing network 104 includes information regarding accounting of network resources, security, traffic measurements, and performance monitoring data. For example, in system 500, management server 102 may manage and configure the routing of television signals through the network elements of network 104.

Network elements 106, 506, 508, and 510 serve as interconnection points in network 104 for carrying information, such as a television signal from terminal device 502 to terminal device 504. Network elements 106, 506, 508, and 510 may include multiple resources and components and support multiple services. For example, resources and components of a network element may include items, such as a network interface card, or other piece of hardware. In addition, network elements 106, 506, 508, and 510 may support multiple services, such as services for ATM, IP, MPLS, etc.

In the embodiment shown in FIG. 5, network elements 106, 506, 508, and 510 may include or be configured as a variety of devices, such as an add-drop multiplexer ("ADM") that interfaces optical fibers to other devices that are to communicate with each other over network 104. Alternatively, network elements 106, 506, 508, and 510 may be other types of SONET devices, such as a digital cross connect, or "drop and continue" network element.

For example, when system 500 is used for distributing television signals, network elements 106, 506, 508, and 510 may be implemented as drop and continue network elements. Drop and continue (also known as "drop and repeat") network elements use known equipment to "drop" selected parts of a signal in a SONET frame, while continuing to pass the signal around a network. Drop and continue network elements are thus useful for distributing television signals because a programming channel can be "dropped", i.e., delivered to terminal device 504, and yet repeated for continued delivery around network 504. All or some of the channels in television signal from terminal device 502 may be selectively delivered to terminal device 504. Channels not delivered to terminal device 504 are also passed through to network 104.

Figure 6:
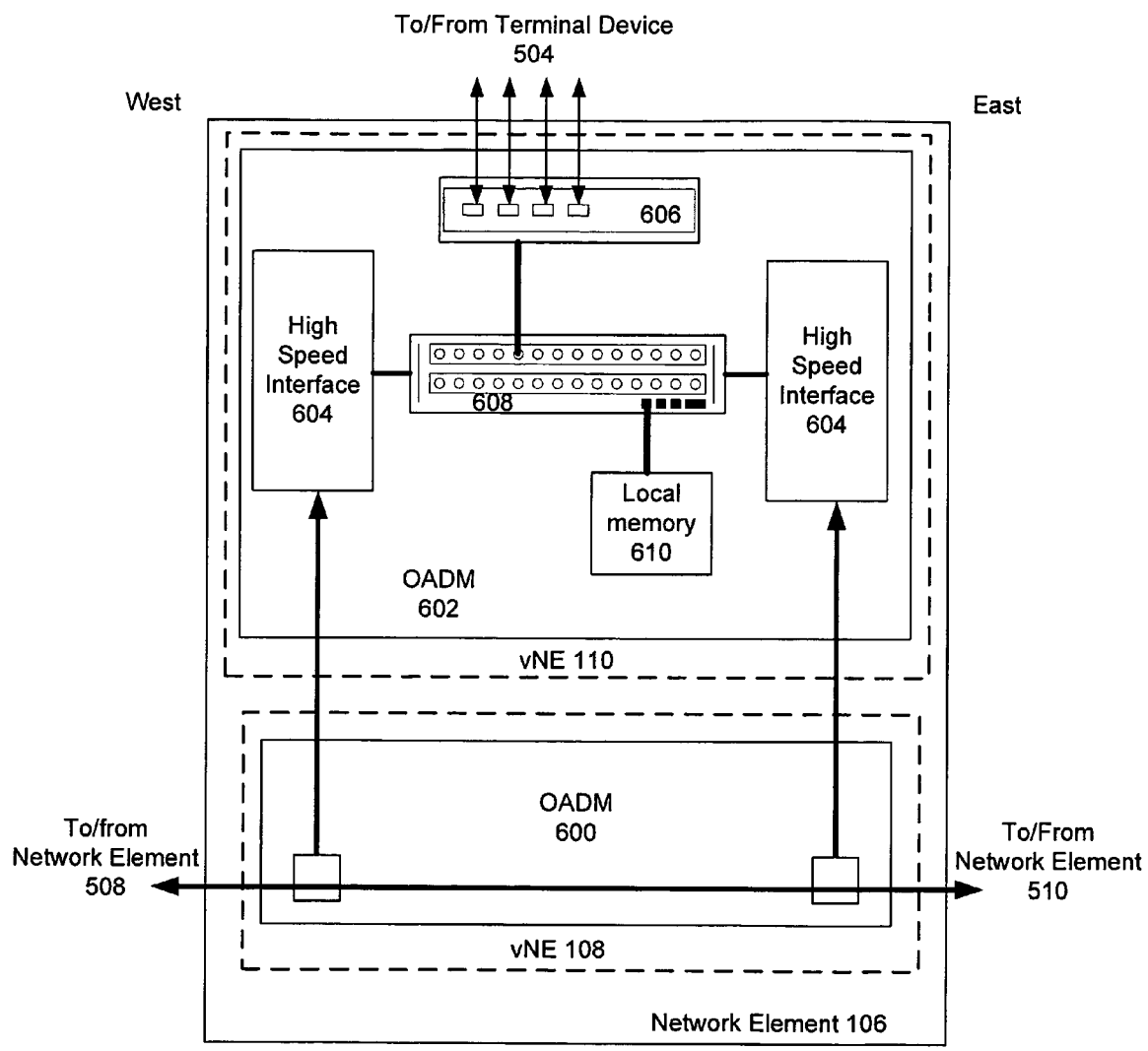
FIG. 6 shows an exemplary network element that is managed in accordance with the principles of the present invention.

FIG. 6 shows an exemplary configuration of network element 106 that is managed in accordance with the principles of the present invention. In particular, for purposes of illustration, FIG. 6 illustrates the configuration of network element 106 when implemented as a drop and continue network element for system 500 illustrated in FIG. 5. As shown, network element 106 may include optical add/drop multiplexers ("OADM") 600 and 602 which are respectively managed by vNEs 108 and 110.

OADM 600 interfaces with the fiber links, for example, between nodes 508 and 510. In addition, OADM 600 replicates the signal on these fiber links and passes at least one copy to OADM 602 while continuing to pass the signal through to nodes 508 and 510. OADM 600 may be implemented using known types of equipment that are capable of driving an optical signal or lightwave through an optical fiber. In general, the present invention may be used with SONET equipment as well as SDH equipment. Therefore, OADM 600 may employ SONET equipment, SDH equipment, or SONET/SDH equipment.

OADM 602 adds and drops lower speed signals into a higher speed signal. For example, OADM 602 may add/drop low speed digital signal ("DS-N") within the optical carrier signal ("OC-N") carried by SONET. FIG. 6 illustrates a simplified diagram of OADM 602. As shown, OADM 602 may comprise high speed interfaces 604, an add/drop interface 606, an add/drop multiplexer 608, and a local memory 610.

High speed interfaces 604 couple OADM 602 with OADM 600. High speed interfaces 604 may be configured as SONET interfaces that operate at synchronous transport signal ("STS") 1/3, or OC-N data rates. High speed interfaces 604 may be implemented using known types of SONET/SDH equipment. For example, high speed interfaces 604 may include components that are capable of driving an optical signal or lightwave through an optical fiber. Accordingly, OADM 602 and high speed interfaces 604 may employ SONET equipment, SDH equipment, or SONET/SDH equipment.

Add/drop interface 606 couples network element 106, for example, to terminal device 504 and adds or drops lower speed signals into the higher speed signal carried by network 104. For example, low speed interface 602 may pass bit or byte synchronous traffic or asynchronous traffic into SONET frames that are carried by network 104. Add/drop interface 606 may be implemented using known circuitry and components. For example, add/drop interface 606 may include circuitry to drive an electrical signal over a copper wire or coaxial cable.

Add/drop multiplexer 608 passes data between high speed interfaces 604. In addition, add/drop multiplexer 608 may add/drop data within the data carried between high speed interfaces 604. For example, add/drop multiplexer 608 may be a fully synchronous byte-oriented multiplexer that is capable of adding or dropping a low speed DS-N signal within the OC-N signal carried by high speed interfaces 604. Add/drop multiplexer 608 may operate bi-directionally and component terminations (such as with terminal device 104) may occur in either direction.

Add/drop multiplexer 608 may also include protection switching capabilities to switch data signals between different optical fibers, such as between "working" and "protect" optical fibers. Furthermore, add/drop multiplexer 608 may include time-slot interchangers to allow cross connection between channels of an OC-N signal.

Local memory 610 stores information that is used by OADM 602. For example, local memory 610 may include information, such as a table, that indicates one or more paths provisioned through OADM 602 to terminal device 104. Local memory 610 may also include information that is used for back-up purposes, such as facility maintenance capabilities. Local memory 610 may be implemented using various types of devices, such as a non-volatile memory device.

As shown, in order to assist with the management of network element 106, OADMs 600 and 602 may be partitioned and represented respectively by vNEs 108 and 110. In particular, vNE 108 may represent OADM 600 while vNE 410 may separately represent OADM 602. The partitioning of OADMs 600 and 602 may be useful for several reasons. For example, since OADM 602 interfaces with terminal device 104, its operations may be more appropriately managed by a protocol, such as SNMP. On the other hand, OADM 600 essentially serves as a splitter in system 500, and thus, its operations may be more appropriately managed by a protocol, such as TMN, and with TL1 commands. As a result of this partitioning, OADMs 600 and 602 may therefore be separately and independently managed.

Figure 7:
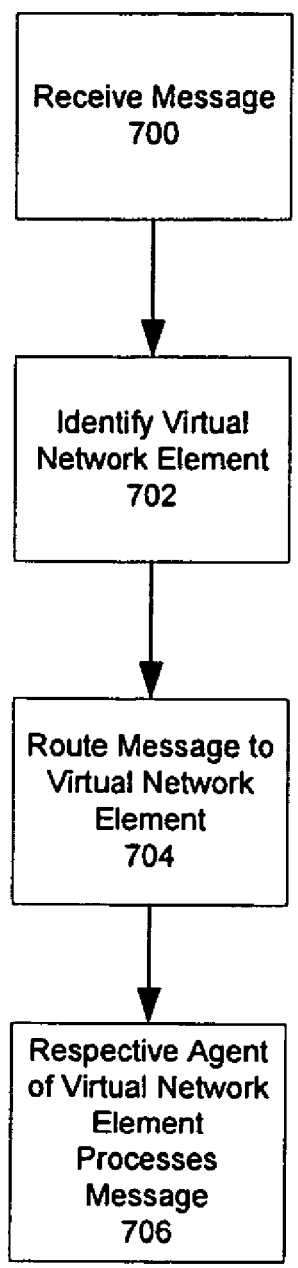
FIG. 7 illustrates an exemplary process flow to for managing a virtual network element in accordance with the principles of the present invention.

FIG. 7 illustrates an exemplary process flow for managing a virtual network element in accordance with the principles of the present invention. In stage 700, hardware 400 of network element 106 receives a network management message. The message may originate from any of the components of system 100 or 500, such as management server 102 or terminal device 504. The message may be encoded based on any known protocol, such as TMN, SNMP, or TL1. Upon receiving the message, hardware 400 passes it shared to vNE operating system 404 through operating system 402. VNE operating system 404 then reads the message and passes it to management interface software 406.

In stage 702, upon receiving a message, management interface software 406 interfaces with message distribution software 408 to determine where to route the message. In particular, management interface software 406 parses the message and identifies at least one object identified in the message. As noted, in one embodiment, the objects in a message may be identified based on the ASN.1 syntax. In addition, management interface software 406 may reference on or more records in MIBs 418, 420, and 422 through message distribution software 408.

Management interface software 406 may then pass the identity of the at least one object to message distribution software 408. Based on the object's identifier, message distribution software 408 then determines which vNE, i.e., vNEs 408 or 410, the message is destined. For example, message distribution software 408 may refer to one or more records in MIB 418 that relates various object identifiers to a particular vNE based on pointers to MIBs 420 and 422. In one embodiment, since the identifiers may use the hierarchical tree structure of the ASN.1 syntax, vNEs 408 and 410 may have separately hierarchies that identify the respective objects assigned to them. Alternatively, MIBs 418, 420, and 422 may be separate database instances, and thus, message distribution software 408 may interface with the appropriate MIB directly.

In stage 704, message distribution software 408 routes the message to the appropriate vNE. For example, if the message was destined for vNE 108, message distribution software 408 may pass the message to agent 414 via an applications program interface. Similarly, if the message was destined for vNEs 110 or 410, then message distribution software 408 may pass the message to agents 416 and 412 respectively.

In stage 706, the vNEs that received the message processes it. For example, if the message was destined to vNE 108, then agent 414 parses the message and reads/modifies the appropriate information in MIB 420. Based on reading the information in MIB 420, agent 414 may monitor the status and performance of one or more resources of network element 106, such as OADM 600. Likewise, agent 414 of vNE 110 may monitor the status of OADM 302 based on information in MIB 422 and agent 412 of base vNE 410 may monitor the status of common hardware in network element 106. Furthermore, agents 412, 414, and 416 may separately control their respective portions of network element 106 by modifying information in their MIBs, i.e., MIBs 418, 420, and 422 respectively. In addition, if necessary, agents 412, 414, or 416 may also compose a message that is sent back to network 104, e.g., to management application 200.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing a network element, said method comprising:
   receiving a message at the network element, wherein the network element comprises a plurality of virtual network elements that operate independently;
   identifying one of the virtual network elements in the network element based on information in the message;
   routing the message to the identified virtual network element;
   retrieving information from a management information base that corresponds to the identified virtual network element based on information in the message, wherein the information comprises status and performance information of the virtual network element;
   modifying the information in the management information based on information in the message, wherein the identified virtual network element is configured responsive to the modified information;
   if the message comprises an upgrade to the identified virtual network element, upgrading the identified virtual network element separately from the plurality of virtual network elements, wherein following the upgrading, the identified virtual network element operates with a different release from at least one of the plurality of virtual network elements; and
   if a fault condition occurs isolated to the identified virtual network element, restoring the identified virtual network element independently from the plurality of virtual network elements, wherein the fault condition does not affect the plurality of virtual network elements.

2. The method of claim 1, wherein receiving the message at the network element comprises receiving a telecommunications management network message.

3. The method of claim 1, wherein receiving the message at the network element comprises receiving a simple network management protocol message.

4. The method of claim 1, wherein identifying one of the virtual network elements comprises:
   identifying an object in the message;
   determining a name of the object; and
   identifying one of the virtual network elements based on the name.

5. The method of claim 1, further comprising sending at least one additional message to a network when the information in the management information base has been modified.

6. The method of claim 1, further comprising sending at least one additional message to a network that includes the information retrieved from the management information base.

7. An apparatus for transporting network communications, said apparatus comprising:
   means for receiving a message;
   means for identifying one of a plurality of virtual network elements defined in the apparatus based on information in the message, wherein the plurality of virtual network elements operate independently from one another;
   means for routing the message to the identified virtual network element;
   means for retrieving information from a management information base that corresponds to the identified virtual network based on information in the message;
   means for managing the identified virtual network element with the information;
   means for configuring the identified virtual network element responsive to the receive message and the retrieved information;
   means for upgrading the identified virtual network element separately from the plurality of virtual network elements, wherein following an upgrade from the means for upgrading, the identified virtual network element operates with a different release from at least one of the plurality of virtual network elements; and
   means for restoring the identified virtual network element independently from the plurality of virtual network elements, wherein a fault condition isolated to the identified network element does not affect the plurality of virtual network elements.

8. The apparatus of claim 7, wherein the means for receiving the message comprises means for receiving a telecommunications management network message.

9. The apparatus of claim 7, wherein the means for receiving the message comprises means for receiving a simple network management protocol message.

10. The apparatus of claim 7, wherein the means for identifying one of the virtual network elements comprises:
    means for identifying an object in the message;
    means for determining a name of the object; and
    means for identifying one of the virtual network elements based on the name.

11. A network element, comprising:
    at least one communications interface configured to connect to a network;
    a first virtual network element that models at least a portion of the network element, wherein the first virtual network element comprises an agent and a management information base; and
    at least one additional virtual network element that models a separate portion of the network element, wherein the first virtual network element and the at least one additional virtual network element operate independently from one another;
    wherein the management information base comprises management information and provisioning information related to the first virtual network element;
    wherein the agent is configured to read and modify the management information base to perform operations, administration, maintenance, and provisioning of the first virtual network element;
    wherein the first virtual network element and the at least one additional virtual network element are configured to be upgraded separately minimizing changes, wherein following an upgrade, the identified virtual network element operates with a different release from the at least one additional virtual network element; and
    wherein, if a fault condition occurs isolated to the first virtual network element, the first virtual network element is configured to be restored independently from the at least one additional virtual network elements, wherein the fault condition does not affect the plurality at least one additional virtual network elements.

12. The network element of claim 11, wherein the at least one communications interface comprises a synchronous optical network interface.

13. The network element of claim 11, wherein the agent is configured as a telecommunications management network agent.

14. The network element of claim 13, wherein the at least one additional virtual network element comprises a second telecommunications management network agent.

15. The network element of claim 13, wherein the at least one additional virtual network element comprises a second agent that is configured as a simple network management protocol agent.

16. The network element of claim 11, wherein the at least one additional virtual network element comprises a management information base that is separate from the management information base for the first virtual network element.

17. An optical network element, comprising:
    at least one interface that is configured to carry an optical signal;
    a splitter, coupled to the at least one interface, that is configured to copy the optical signal while continuing to pass the optical signal to at least one other network element;
    an add/drop multiplexer, coupled to the splitter, that is configured to receive the copy of the optical signal and selectively multiplex another signal into the optical signal;
    a first virtual network element that models the splitter based on objects stored in a first management information base;
    a second virtual network element that models the add/drop multiplexer based on objects stored in a second management information base, wherein the first virtual network element and the second virtual network element operate independently from one another;
    a first telecommunications management network agent configured to read and modify the first management information base to manage and configure the first virtual network element; and
    a second telecommunications management network agent configured to read and modify the second management information base to manage and configure the second virtual network element;
    wherein the first virtual network element and the second virtual network element are configured to be upgraded separately minimizing changes, wherein following an upgrade, the first virtual network element operates with a different release from the second virtual network element; and
    wherein, if a fault condition occurs isolated to the first virtual network element, the first virtual network element is configured to be restored independently from the second virtual network element, wherein the fault condition does not affect the second virtual network element.

* * * * *